United States Patent
Zhou (10) Patent No.: US 7,171,179 B2
(45) Date of Patent: Jan. 30, 2007

(54) ADJUSTMENT OF A RECEIVED SIGNAL STRENGTH INDICATION MODULE

(75) Inventor: Zhmin Zhou, Rancho Palos Verdes, CA (US)

(73) Assignee: Broadcom Corporation, Irvine, CA (US)

(*) Notice: Subject to any disclaimer, the term of this patent is extended or adjusted under 35 U.S.C. 154(b) by 323 days.

(21) Appl. No.: 10/941,149

(22) Filed: Sep. 15, 2004

(65) Prior Publication Data

US 2005/0287974 A1    Dec. 29, 2005

Related U.S. Application Data

(60) Provisional application No. 60/583,466, filed on Jun. 28, 2004.

(51) Int. Cl.
*H04B 17/00* (2006.01)
*H04B 1/06* (2006.01)

(52) U.S. Cl. .............. 455/226.2; 455/250.1; 455/115.3

(58) Field of Classification Search ............ 455/226.1, 455/226.2, 250.1, 251.1, 340, 127.1, 127.2, 455/240.1, 241.1, 67.11, 522, 115.3, 115.1, 455/232.1, 234.1, 277.2, 245.1; 331/74; 343/703; 375/317, 320, 327, 345, 346
See application file for complete search history.

(56) References Cited

U.S. PATENT DOCUMENTS

| | | | | |
|---|---|---|---|---|
| 6,859,646 | B2* | 2/2005 | Khorram | 455/234.1 |
| 6,915,114 | B2* | 7/2005 | Khorram | 455/226.2 |
| 6,977,531 | B2* | 12/2005 | Chien | 455/115.1 |
| 7,054,603 | B2* | 5/2006 | Khorram | 455/234.1 |
| 7,107,013 | B2* | 9/2006 | Qiu | 455/67.11 |
| 7,113,754 | B2* | 9/2006 | Chien | 455/115.3 |

* cited by examiner

*Primary Examiner*—Augn Moe
(74) *Attorney, Agent, or Firm*—Garlick Harrison & Markison; Timothy W. Markison (57) ABSTRACT

A method for adjusting a received signal strength indication (RSSI) begins by obtaining a first RSSI value of a first signal, wherein the first signal has a known first power level. The method continues when the first RSSI value does not substantially correspond to the known first power level by adjusting an RSSI intercept value of an RSSI curve until the first RSSI value substantially corresponds to the known first power level. The method continues by obtaining a second RSSI value of a second signal, wherein the second signal has a known second power level. The method continues when second RSSI value does not substantially correspond to the known second power level by adjusting slope of the RSSI curve until the second RSSI value substantially corresponds to the known second power level.

28 Claims, 10 Drawing Sheets

FIG. 4
RSSI module 100

FIG. 5
rectifier module 120 or 122

FIG. 6
rectify circuit

FIG. 8
1st signal power

FIG. 7

FIG. 9
adjust offset (e.g., shift nominal curve)

FIG. 10
determine 2nd signal power

FIG. 11
adjust gain (e.g. adjust slope)

ADJUSTMENT OF A RECEIVED SIGNAL STRENGTH INDICATION MODULE

This patent application is claiming priority under 35 USC §119 (e) to provisionally filed patent application having the same title as the present patent application, a provisional Ser. No. of 60/583,466, and a provisional filing date of Jun. 28, 2004.

BACKGROUND OF THE INVENTION

1. Technical Field of the Invention

This invention relates generally to wireless communications and more particularly to measuring signal strength of received radio frequency signals.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the signal strength of a received RF signal may vary dramatically (e.g., by 100 dB). To accommodate such a large swing, the receiver includes automatic gain control (AGC) circuitry to adjust the gain of the low noise amplifier, the programmable gain amplifier, and/or digital gain within the data recovery stage depending on the signal strength of the received RF signal. For instance, the AGC increases the gain of the receiver such that it is sensitive enough to detect low power level signals and fast enough to adjust the gain of the receiver to a nominal level regardless of whether the received RF signal is a weak one or a strong one once the signal is detected.

For the AGC circuitry to work properly, it needs to receive an accurate measure of the power level of the received RF signal. Accordingly, most RF receivers include a receive signal strength indicator (RSSI) that measures the power level of the received RF signal. While there are numerous embodiments of an RSSI, they all suffer from process variations when implemented on an integrated circuit, especially when using CMOS technology. Thus, from chip to chip, the RSSI measures received RF signals differently. Generally, the RSSI is designed to accommodate for the variations, which limits the range of operation of the RSSI. Accordingly, other components within the receiver are also limited. For instance, with a limited RSSI range, the dynamic range of the ADC is limited, which reduces the resolution of the receiver.

Therefore, a need exists for a method and apparatus of adjusting the operation of an RSSI module to provide a more predictable range of operation, which, in turn, provides a more predictable range of operation for other components in the receiver and improves resolution.

BRIEF SUMMARY OF THE INVENTION

The adjustment of a received signal strength indication module of the present invention substantially meets these needs and others. In one embodiment, a method for adjusting a received signal strength indication (RSSI) module begins by receiving a first signal having a first known power level. The method continues by measuring power of the first signal to produce a first measured power level. The method continues by comparing the first known power level with the first measured power level. The method continues when the first known power level compares unfavorably with the first measured power level by adjusting offset of the RSSI module until the first known power level compares favorably with the first measured power level. The method continues by receiving a second signal having a second known power level, wherein the second known power level is less than the first known power level. The method continues by measuring power of the second signal to produce a second measured power level. The method continues by comparing the second known power level with the second measured power level. The method continues when the second known power level compares unfavorably with the second measured power level by adjusting gain of the RSSI module until the second known power level compares favorably with the second measured power level.

In another embodiment, a method for adjusting a received signal strength indication (RSSI) begins by obtaining a first RSSI value of a first signal, wherein the first signal has a known first power level. The method continues when the first RSSI value does not substantially correspond to the known first power level by adjusting an RSSI intercept value of an RSSI curve until the first RSSI value substantially corresponds to the known first power level. The method continues by obtaining a second RSSI value of a second signal, wherein the second signal has a known second power level. The method continues when second RSSI value does not substantially correspond to the known second power level by adjusting slope of the RSSI curve until the second RSSI value substantially corresponds to the known second power level.

DETAILED DESCRIPTION OF THE INVENTION

Figure 1:
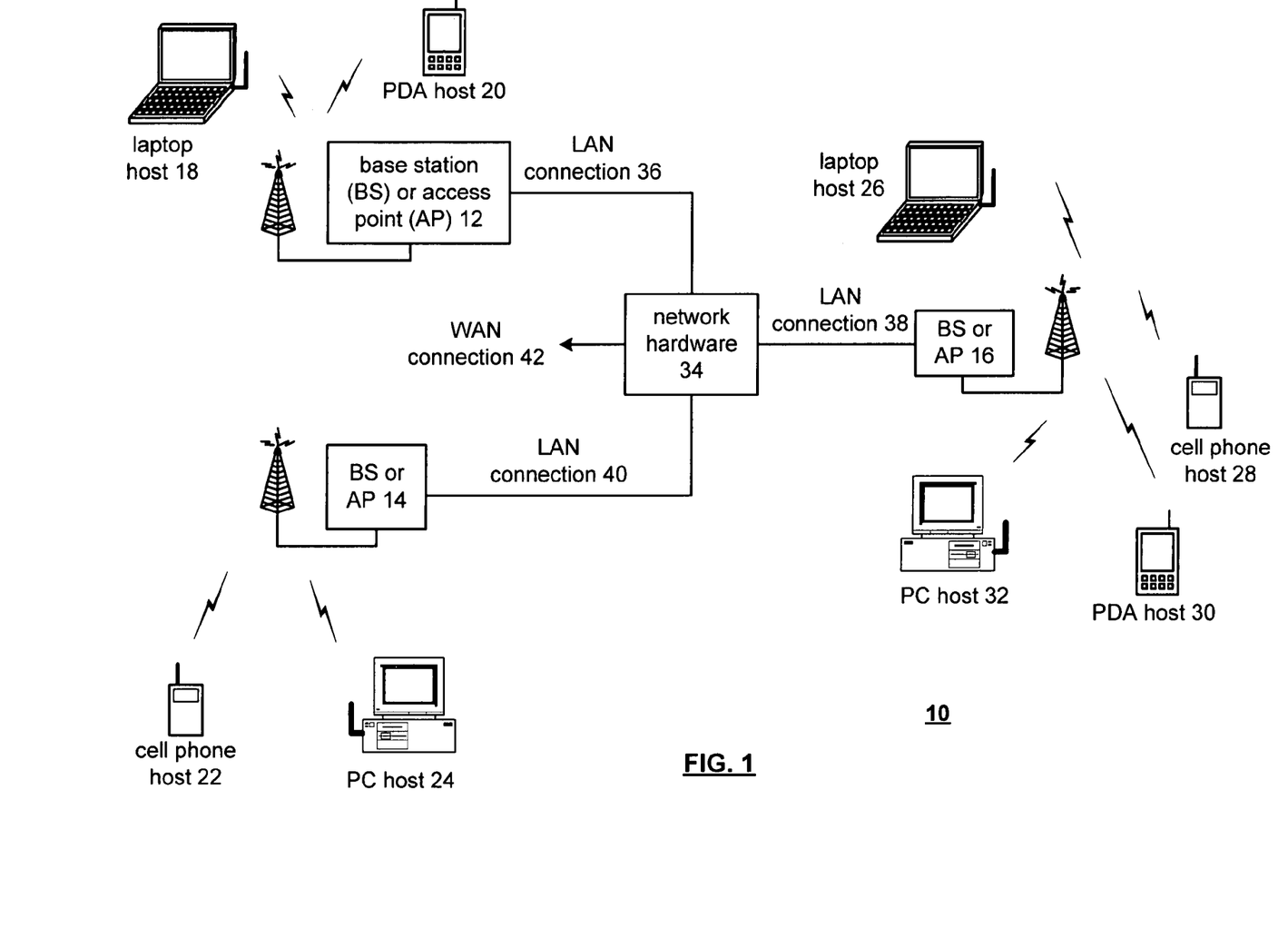
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
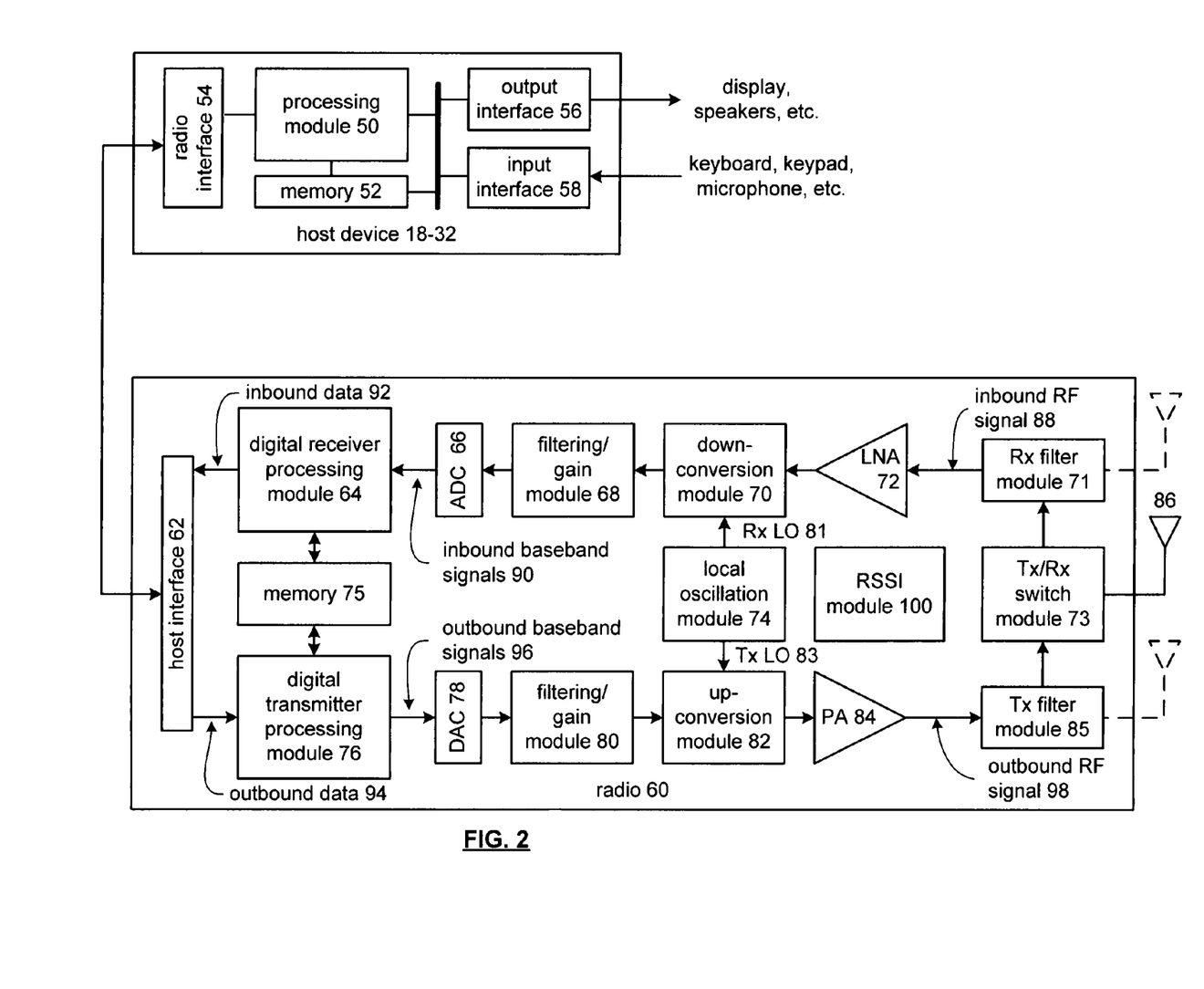
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, an antenna 86, and a received signal strength indication (RSSI) module 100. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The filtering/gain module 68 filters and/or gains the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64 decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18–32 via the radio interface 54.

As one of ordinary skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
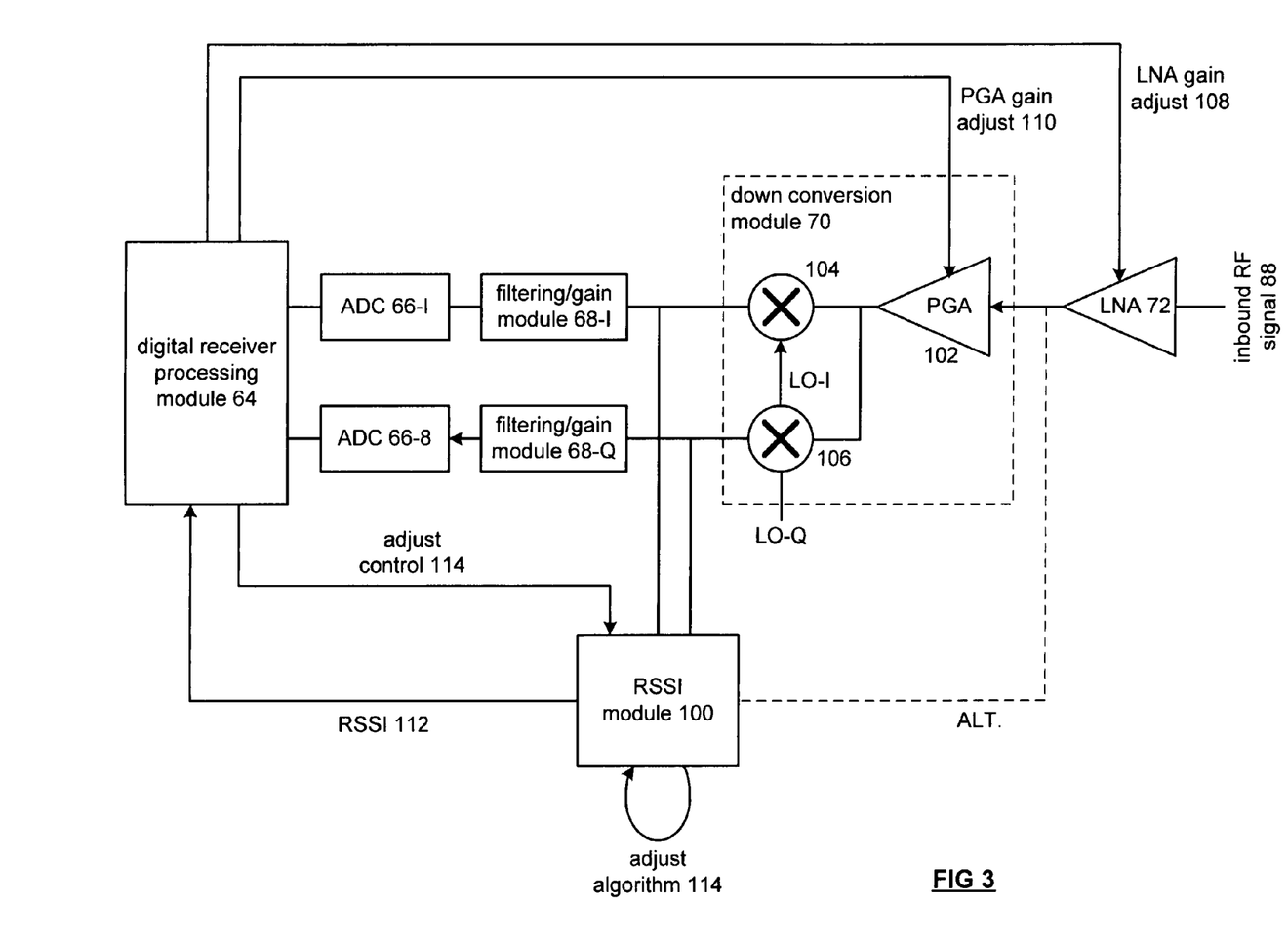
FIG. 3 is a schematic block diagram of a receiver section of a wireless communication device in accordance with the present invention.

FIG. 3 is a schematic block diagram of the receiver section of the wireless communication device of FIG. 2. The receiver includes the LNA 72, the down conversion mixer 70, the filter and/or gain module 68, the analog-to-digital converter 66 and the digital receiver processing module 64. The down conversion module 70 includes a programmable gain amplifier 102 and a pair of mixers 104 and 106. The filter/gain module 68 includes an in-phase filter/gain module and a quadrature filter/gain module 68-Q. The analog-to-digital converter 66 includes an in-phase ADC 66-I and a quadrature ADC 66-Q. The receiver also includes the RSSI module 100 that may be coupled to the output of the down conversion module 70 or alternatively to the output of low noise amplifier 72.

In operation, the low noise amplifier 72 receives inbound RF signals 88 and, based on a low noise gain adjust signal 108, amplifies the inbound RF signals. The programmable gain amplifier 102 further amplifies, based on a PGA gain adjust signal 110, the inbound RF signals, which are provided to the mixers 104 and 106. The mixers mix the amplified inbound RF signals with a local oscillation in-phase component (LO-I) and a quadrature local oscillation (LO-Q), respectively. The mixers output a baseband in-phase component and a baseband quadrature component.

The in-phase and quadrature filter modules 68 filter and/or adjust the gain of the baseband signals which are subsequently converted to digital signals via analog-to-digital converters 66-1 and 66-I. The digital receiver processing module 64 converts the digital in-phase and quadrature signals into inbound data.

The digital receiver processing module 64 generates the programmable gain adjust 110 and LNA gain adjust 108 based on the RSSI value 112. The receiver module 100 determines the RSSI value 112 based on the baseband in-phase and quadrature components outputted by the down conversion module 70 or via the output of low noise amplifier 72. To provide an accurate RSSI value 112, the RSSI module 100, based on adjust control signals 114 provided by the digital receiver processing module 64, performs an adjust algorithm 115. The adjustment of the RSSI module 100 will be described in greater detail with reference to FIGS. 4–13.

Figure 4:
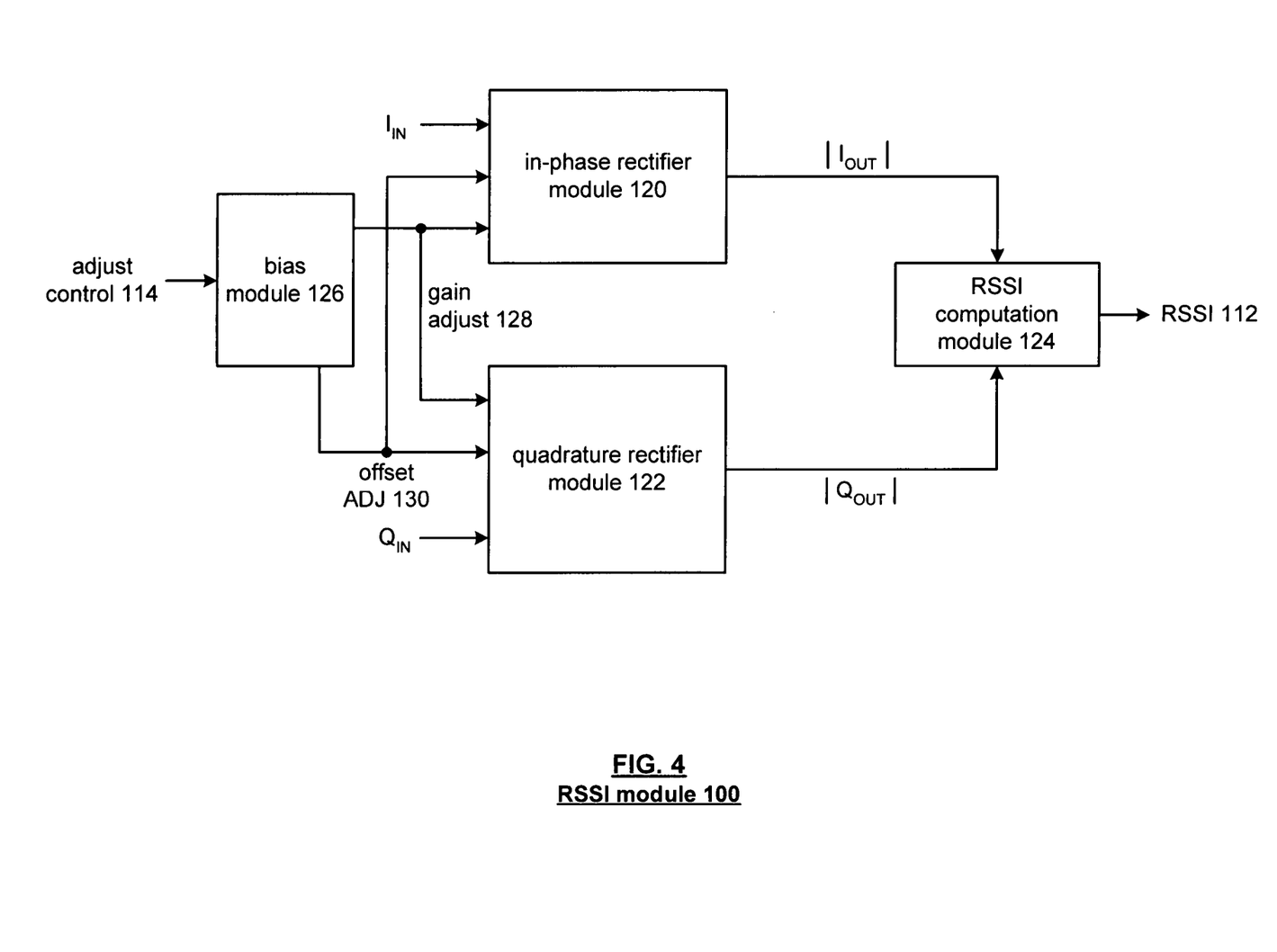
FIG. 4 is a schematic block diagram of a received signal strength indication module in accordance with the present invention.

FIG. 4 is a schematic block diagram of the RSSI module 100 that includes a bias module 126, an in-phase rectifier module 120, a quadrature rectifier module 122, and an RSSI computation module 124. In operation, the in-phase and quadrature rectifier modules 120 and 122 receive the in-phase and quadrature baseband components and rectify these signals to produce rectified in-phase and quadrature outputs ($I_{out}$ and $Q_{out}$). The gain and offset of the in-phase and quadrature rectifier modules 120 and 122 are adjusted via gain adjust signals 128 and offset adjust signals 130.

The bias module 126 produces the gain and offset adjust signals 128 and 130 based on the adjust control signals 114 provided by the digital receiver processing module 64. In general, the bias module 126 adjusts the gain and/or offset of the rectifier modules 120 and 122 to compensate for process variations such that from chip-to-chip the RSSI value corresponds with the input power of the inbound RF signals.

The RSSI computation module 124 performs a mathematical function to produce the RSSI value 112. In one embodiment, the RSSI computation module 124 determines the RSSI value based on a first measured RSSI value and a second measured RSSI value. From the first measured value, the offset of the RSSI value 112 is adjusted based on offsets of the RSSI module 110. From the second measured value, the gain of the RSSI module 110 is adjusted. The adjusting of the RSSI module 110 will be further described with reference to FIGS. 5–13.

Figure 5:
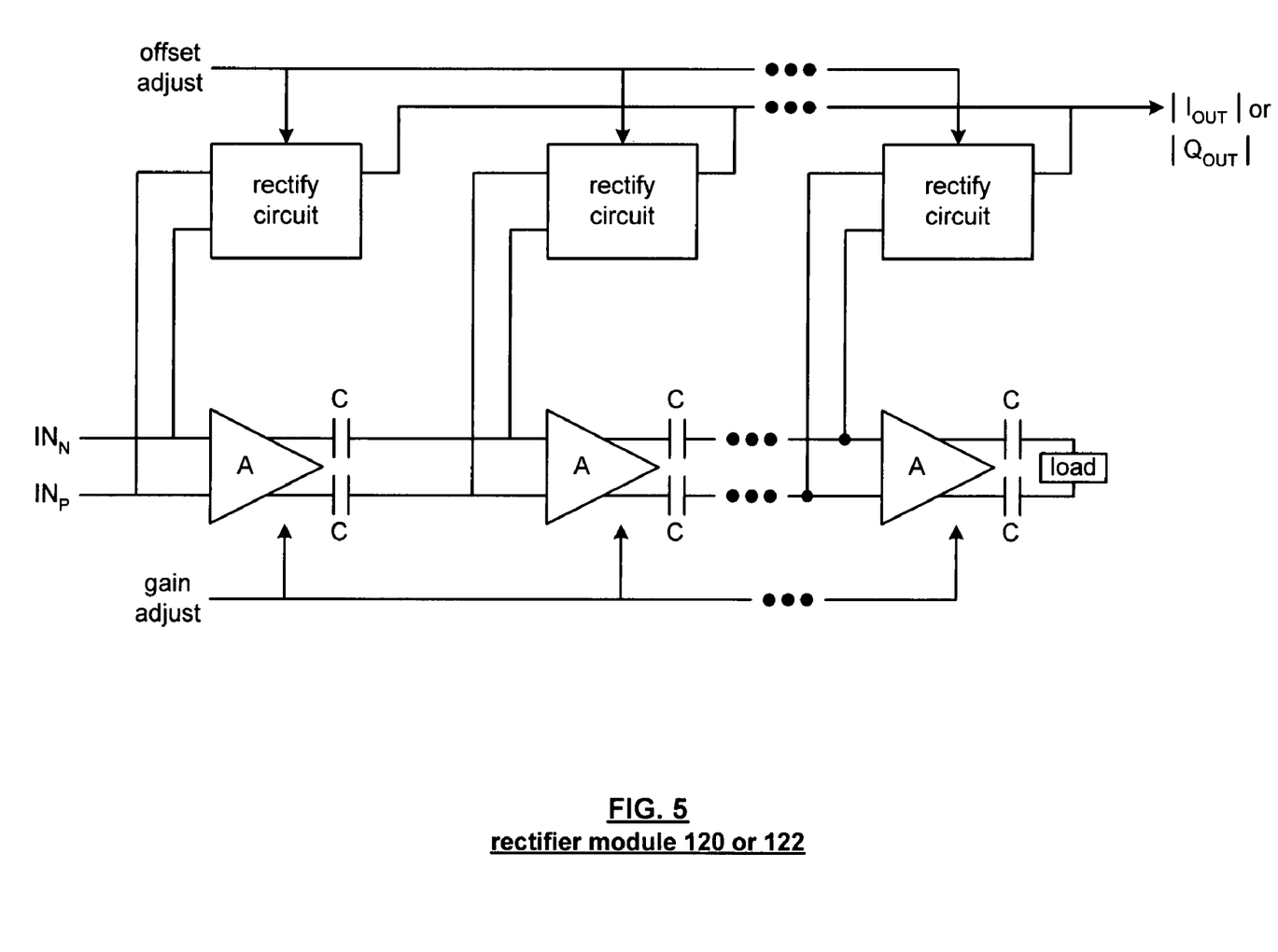
FIG. 5 is a schematic block diagram of a rectifier module of the RSSI module in accordance with the present invention.

FIG. 5 is a schematic block diagram of a rectifier module 120 or 122 that includes a plurality of rectifying circuits and a plurality of amplifiers (A). The gain of the RSSI module 110 may be adjusted by changing the individual gains of the amplifiers (A) and/or by switching in and out amplifiers via the gain adjust. The offset of the RSSI module 110 may be adjusted by adjusting the biasing levels of the rectifying circuits via the offset adjust as will be described in greater detail with reference to FIG. 6.

Figure 6:
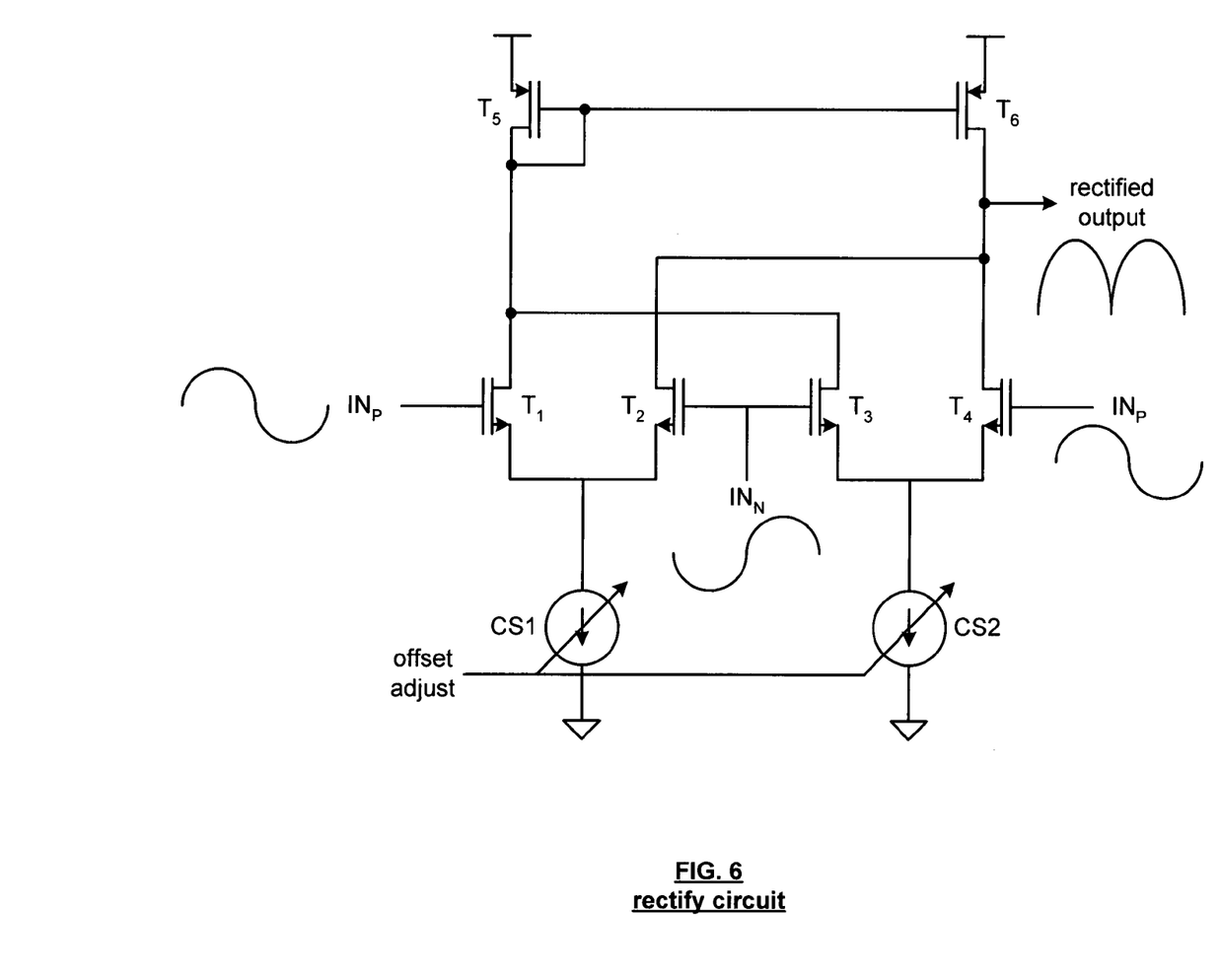
FIG. 6 is a schematic block diagram of a rectifying circuit in accordance with the present invention.

FIG. 6 is a schematic block diagram of a rectifying circuit that includes a plurality of transistors T1–T6 and current sources CS1 and CS2. The current sources are adjustable via the offset adjust signal. By adjusting the current sinked by the current sources, the operating levels of the corresponding transistors is changed such that the magnitude of the resulting rectified signal is proportional to the current flowing through the current sources. Accordingly, for a differential input, the resulting rectified signal is adjusted based on the offset adjust signal controlling the current sources.

Figure 7:
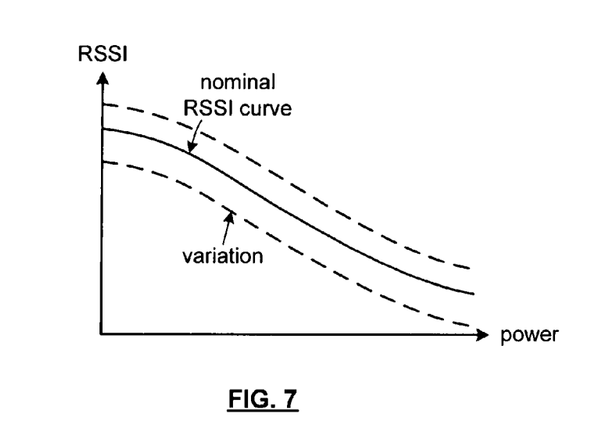
FIGS. 7–11 are graphs illustrating the operation of the RSSI module in accordance with the present invention.

FIGS. 7–11 provide a graphical example of how the RSSI module is adjusted based on the offset adjust signal and the gain adjust signal. FIG. 7 is a graph depicting the nominal RS curve (i.e., the ideal RSSI curve for a given input power with zero component variations of the RSSI module 110). The variation curve indicates the potential variation of the computation of the RSSI value from RSSI module to RSSI module on different integrated circuits due to component and/or processing variations. As such, from part-to-part, the same input power may produce a different RSSI value causing different gain settings to be prescribed for the PGA and/or LNA. With varying gain settings, the dynamic range of the receiver is reduced thus, reducing the overall efficiency of the receiver.

Figure 8:
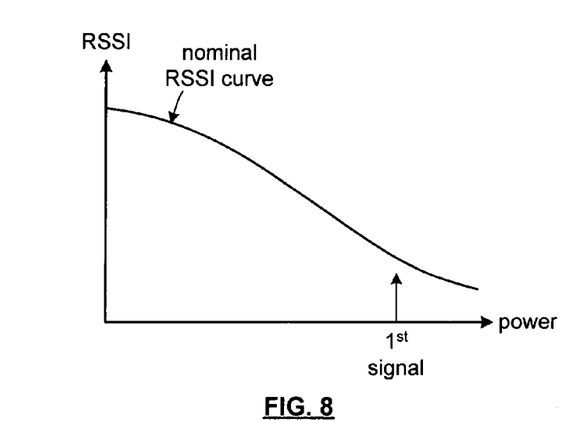

FIG. 8 is a graph illustrating the application of a $1^{st}$ signal to the receiver having a $1^{st}$ power level with respect to the nominal RSSI curve. In this example, the $1^{st}$ signal has a known power but when the RSSI value is calculated by an adjusted RSSI module 110 and compared to the nominal RSSI curve, its magnitude is less than it should be (i.e., with zero part tolerance, the magnitude of the $1^{st}$ signal should lie on the nominal RSSI curve).

Figure 9:
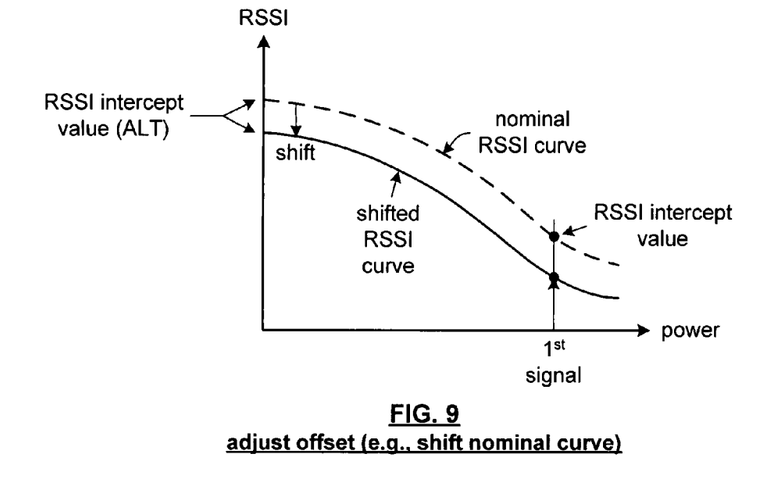

FIG. 9 illustrates the adjustment of the RSSI curve by adjusting the offset value of the rectifying circuits of the RSSI module 110. As shown, the nominal RSSI curve is shifted down such that the RSSI intercept value, which corresponds to the magnitude of the RSSI value of the $1^{st}$ signal, lies on the shifted RSSI curve. Alternatively, the RSSI intercept value may occur at any point along the RSSI curve including at zero power level. As one of ordinary skill in the art will appreciate, the computed RSSI value may exceed the nominal curve based on component and/or process variations such that the nominal RSSI curve would need to be shifted upward.

Figure 10:
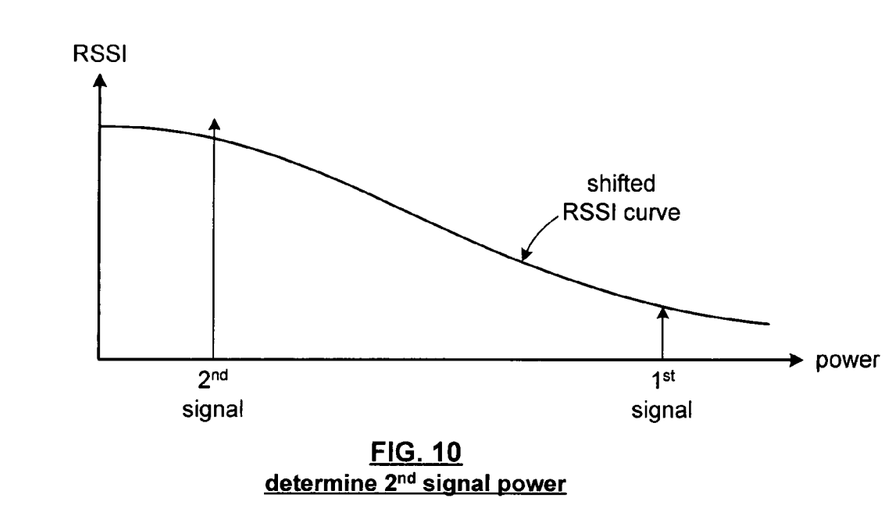

FIG. 10 illustrates the calculated RSSI value of a $2^{nd}$ signal having a $2^{nd}$ known power level compared to the shifted adjusted RSSI curve of FIG. 9. In this example, the RSSI value of the $2^{nd}$ signal is greater than the anticipated value based on the shifted RSSI curve. To adjust for the difference in the expected RSSI value and the calculated RSSI value for the $2^{nd}$ signal, the gain of the RSSI module, or the slope of the RSSI curve, is adjusted by changing the gain of the amplifier(s) of the RSSI module 110.

Figure 11:
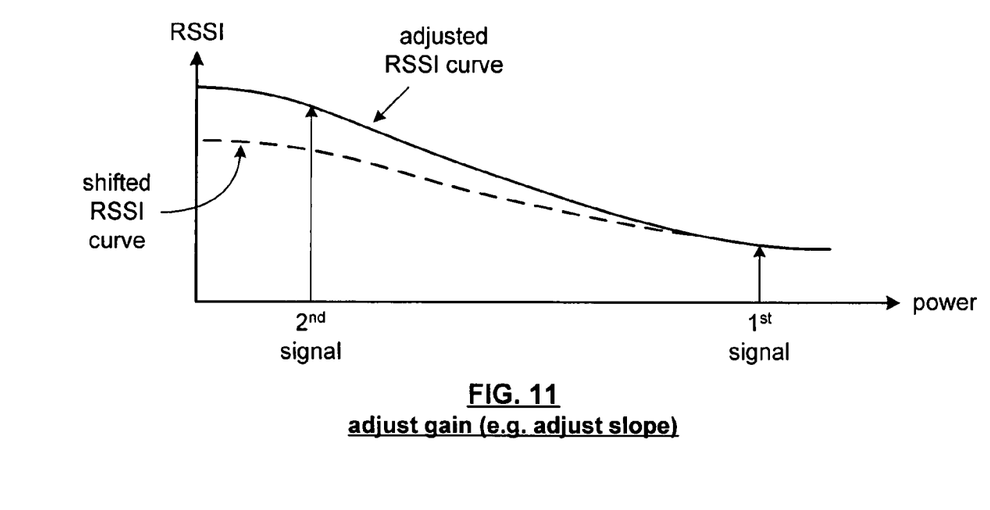

FIG. 11 illustrates the adjustment of the slope of the RSSI curve by adjusting the gain of the RSSI module. In this instance, the gain of the curve is adjusted such that at the measured RSSI value for the $2^{nd}$ signal the adjusted RSSI curve intersects the measured, or calculated, RSSI value of the $2^{nd}$ signal and the measured, or calculated, RSSI value of the $1^{st}$ signal. By making these adjustments, based on known power levels of two different signals, power levels that lie in between that of the $1^{st}$ and $2^{nd}$ signal from part-to-part will have substantially the same RSSI values computed therefor. In one embodiment, the difference between the $1^{st}$ and $2^{nd}$ signal power levels may be approximately 60 dB. As one of ordinary skill in the art will appreciate, the RSSI versus power graph may be inverted such that as power increases as the RSSI value increases.

Figure 12:
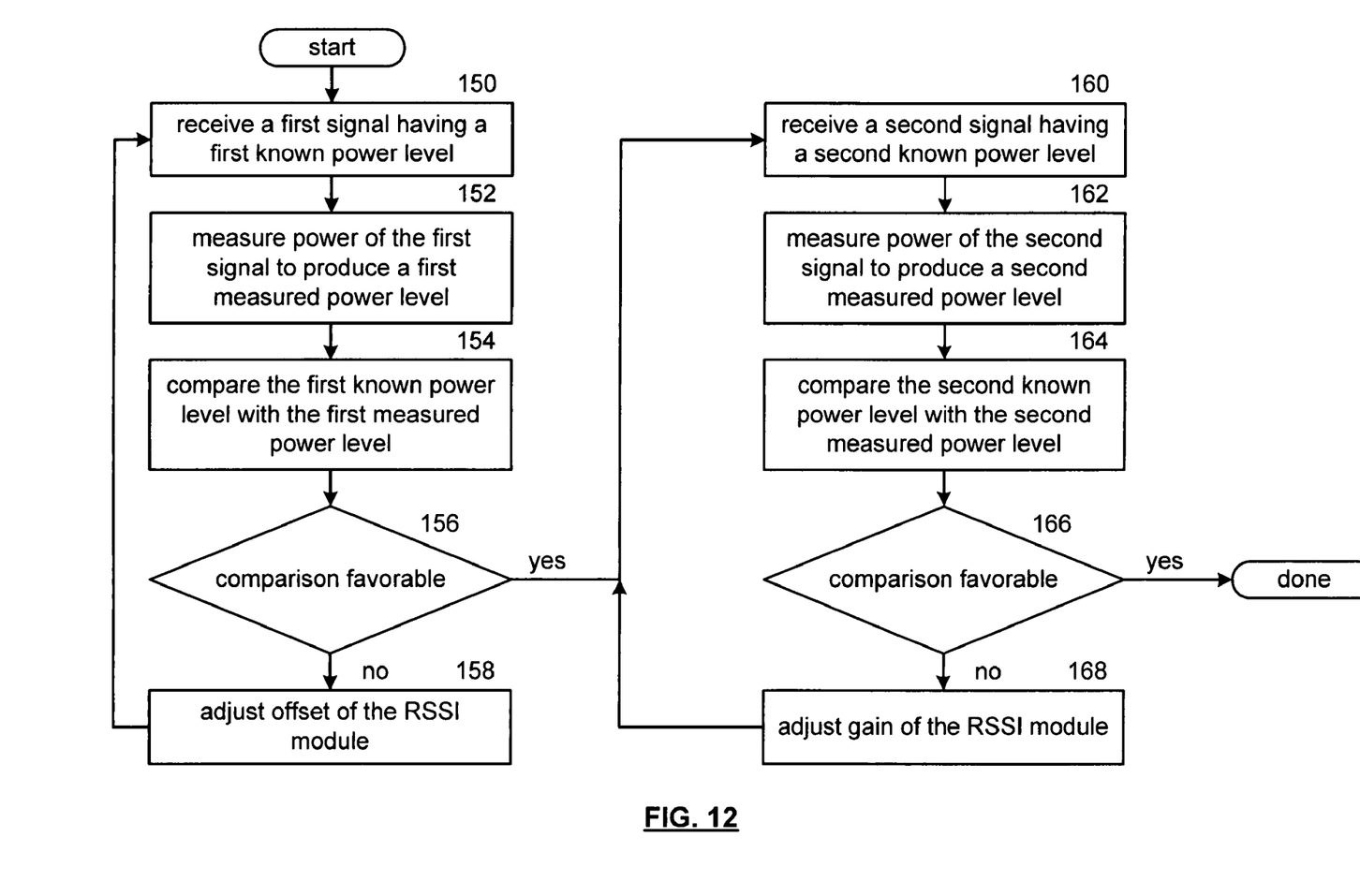
FIG. 12 is a logic diagram of a method for adjusting an RSSI module in accordance with the present invention.

FIG. 12 is a logic diagram of a method for adjusting a received signal strength indication module. The process begins at Step 150 where a $1^{st}$ signal having a $1^{st}$ known power level is received. The process then proceeds to Step 152 where the power of the $1^{st}$ signal is measured to produce a $1^{st}$ measured power level. The process then proceeds to Step 154 where the $1^{st}$ known power level is compared with the $1^{st}$ measured power level. The process then proceeds to Step 156 where if the comparison was favorable the process branches to Step 160. If the comparison was not favorable, the process branches to Step 158.

At Step 158 the offset of the RSSI module is adjusted and the process is repeated at Step 150 with the RSSI module having an adjusted offset. This adjustment may be done iteratively or by calculating the desired offset. If the offset adjustment is done iteratively, it may be done by adjusting the offset of the RSSI module by a step offset value (e.g., corresponding to a 2 dB step) to produce an iterative adjustment value. The iterative adjustment continues by receiving the $1^{st}$ signal subsequent to the iterative adjustment of the offset and measuring the power of the $1^{st}$ signal to produce an offset measured power level. The iterative adjustment continues by comparing the $1^{st}$ known power level with the offset measured power level. If the comparison is unfavorable, the process continues until the comparison is favorable. Note that the offset may be done by adjusting an injection current level produced by the current sources a rectifier module of the RSSI module.

When the process branches to Step 160, a $2^{nd}$ signal having a $2^{nd}$ known power level is received. Note that in one embodiment the $2^{nd}$ known power level may be less than the $1^{st}$ known power level. The process then proceeds to Step 162 where the power of the $2^{nd}$ signal is measured to produce a $2^{nd}$ measured power level. The process then proceeds to Step 164 where the $2^{nd}$ known power level is compared with the $2^{nd}$ measured power level.

The process then proceeds to Step 166 where, if the comparison is favorable, the process is complete. If the comparison is unfavorable, the process proceeds to Step 168 where the gain of the RSSI module is adjusted and the process repeats at Step 160. In one embodiment, the gain may be adjusted iteratively or by calculating the gain based on the $2^{nd}$ known power level and the measured power level. If the gain is adjusted iteratively, the gain is adjusted by a step gain value and the process repeats with respect to Steps 160 and 166. As one of ordinary skill in the art will appreciate, a desire of making the adjustments of the RSSI module is to produce a known RSSI value range from part to part such that maximum dynamic range of the analog-to-digital converter 66 of FIGS. 2 and 3 can be achieved, thereby improving the receiver's sensitivity.

Figure 13:
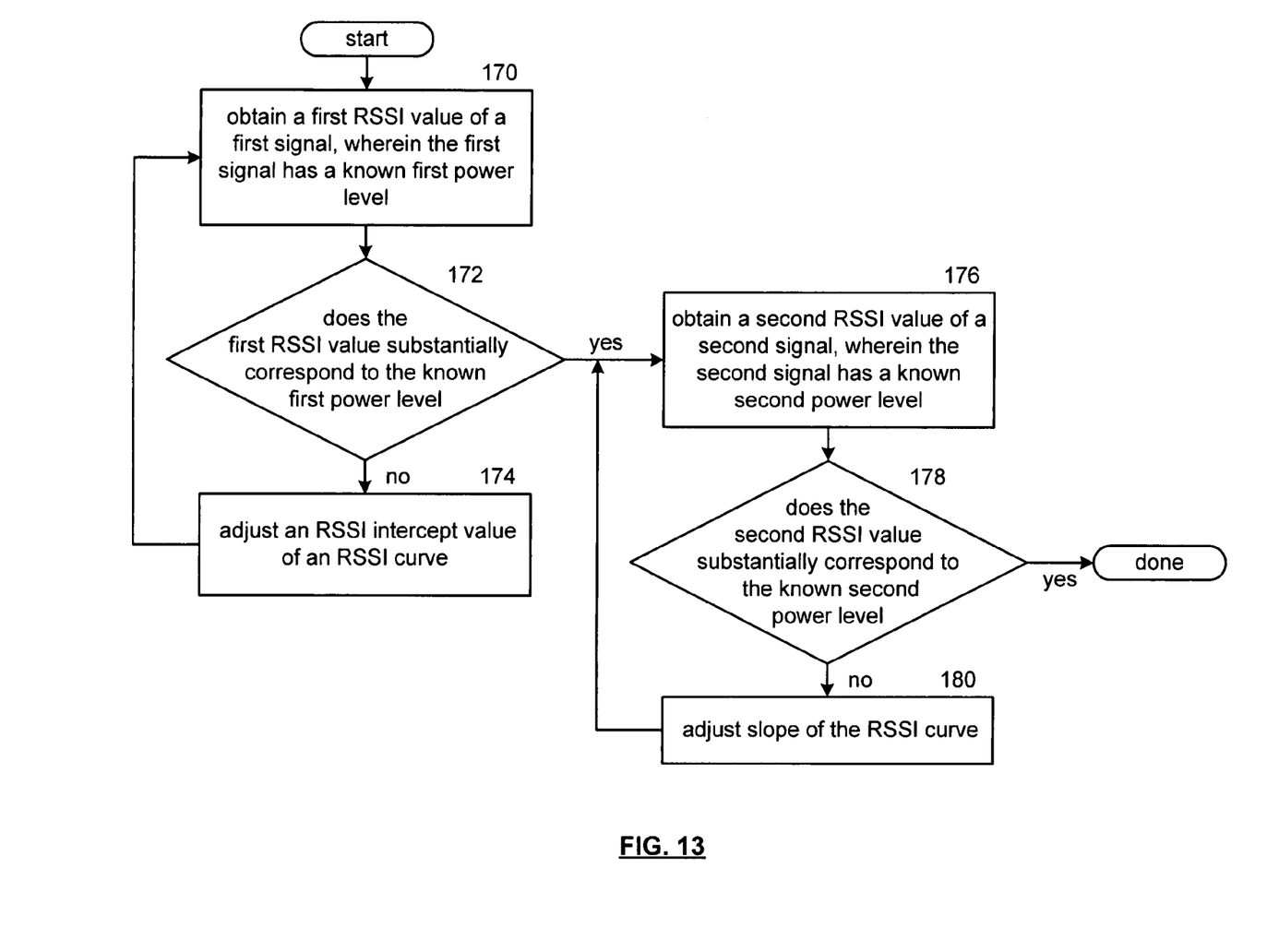
FIG. 13 is a logic diagram of a method for adjusting an RSSI value in accordance with the present invention.

FIG. 13 is a logic diagram of a method for adjusting a received signal strength indication. The process begins at Step 170 where a $1^{st}$ RSSI value is obtained for a $1^{st}$ signal. In an embodiment, the $1^{st}$ signal has a known power level. The process then proceeds to Step 172 where a determination is made as to whether the $1^{st}$ RSSI value substantially corresponds to a known $1^{st}$ power level. If not, the process proceeds to Step 174 where an RSSI intercept value of an RSSI curve is adjusted. This may be adjusted by adjusting an offset of an RSSI module that produces the $1^{st}$ and $2^{nd}$ RSSI values. Note that the $1^{st}$ RSSI value may be calculated based on a maximum function of [log(Mod(I)), log(Mod(Q)), where I is an in-phase component of the first signal and Q is a quadrature component of the first signal.

When the process branches to Step 176, a $2^{nd}$ RSSI value of a $2^{nd}$ signal is obtained. In one embodiment, the $2^{nd}$ signal has a known power level. The RSSI value may be calculated based on a maximum function of [log(Mod(I)), log(Mod(Q)), where I is an in-phase component of the second signal and Q is a quadrature component of the second signal.

The process then proceeds to Step 178 where determination is made as to whether the $2^{nd}$ RSSI value substantially corresponds to the known $2^{nd}$ power level. If so, the adjustment of the RSSI value is complete. If not, the process proceeds to Step 180 where the slope of the RSSI curve is adjusted. In one embodiment, the slope of the RSSI curve may be adjusted by adjusting gain of the RSSI module that produces the $1^{st}$ and $2^{nd}$ RSSI values.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for adjusting a received signal strength indication. By adjusting a received signal strength indication to compensate for process variations, from receiver-to-receiver the operations are more consistent thereby producing more efficient receivers. As one of ordinary skill in the art will appreciate, other embodiments may be derived from the teaching of the present invention without deviating from the scope of the claims.

What is claimed is:

1. A method for adjusting a received signal strength indication (RSSI) module, the method comprises:
   receiving a first signal having a first known power level;
   measuring power of the first signal to produce a first measured power level;
   comparing the first known power level with the first measured power level;
   when the first known power level compares unfavorably with the first measured power level, adjusting offset of the RSSI module until the first known power level compares favorably with the first measured power level;
   receiving a second signal having a second known power level, wherein the second known power level is less than the first known power level;
   measuring power of the second signal to produce a second measured power level;
   comparing the second known power level with the second measured power level; and
   when the second known power level compares unfavorably with the second measured power level, adjusting gain of the RSSI module until the second known power level compares favorably with the second measured power level.

2. The method of claim 1, wherein the adjusting offset of the RSSI module until the first known power level compares favorably with the first measured power level comprises at least one of:
   iteratively adjusting the offset of the RSSI module; and
   calculating the offset based on the first known power level and the first measured power level.

3. The method of claim 2, wherein the iteratively adjusting the offset comprises:
   adjusting the offset of the RSSI module by a step offset value to produce an iterative adjustment of the offset;
   receiving the first signal subsequent to the iterative adjustment of the offset;
   measuring the power of the first signal to produce an offset measured power level;

comparing the first known power level with the offset measured power level;

when the comparison is unfavorable, repeating the adjusting, the receiving, the measuring, and the comparing.

4. The method of claim 1, wherein the adjusting the offset comprises:
adjusting an injected current level of at least one rectifier of the RSSI module.

5. The method of claim 1, wherein the adjusting gain of the RSSI module until the second known power level compares favorably with the second measured power level comprises at least one of:
iteratively adjusting the gain of the RSSI module; and
calculating the gain based on the second known power level and the second measured power level.

6. The method of claim 5, wherein the iteratively adjusting the gain comprises:
adjusting the gain of the RSSI module by a step offset value to produce an iterative adjustment of the gain;
receiving the second signal subsequent to the iterative adjustment of the gain;
measuring the power of the second signal to produce an gain measured power level;
comparing the second known power level with the gain measured power level;
when the comparison is unfavorable, repeating the adjusting, the receiving, the measuring, and the comparing.

7. The method of claim 1, wherein the adjusting the gain of the RSSI module comprises:
adjusting a bias level of at least one rectifier of the RSSI module.

8. The method of claim 1, wherein each of the adjusting offset of the RSSI module until the first known power level compares favorably with the first measured power level and the adjusting gain of the RSSI module until the second known power level compares favorably with the second measured power level comprises:
achieving maximum dynamic range of an analog to digital converter of a radio frequency receiver.

9. A method for adjusting a received signal strength indication (RSSI), the method comprises:
obtaining a first RSSI value of a first signal, wherein the first signal has a known first power level;
when the first RSSI value does not substantially correspond to the known first power level, adjusting an RSSI intercept value of an RSSI curve until the first RSSI value substantially corresponds to the known first power level;
obtaining a second RSSI value of a second signal, wherein the second signal has a known second power level; and
when second RSSI value does not substantially correspond to the known second power level, adjusting slope of the RSSI curve until the second RSSI value substantially corresponds to the known second power level.

10. The method of claim 9, wherein the obtaining the first RSSI value comprises:
calculating the first RSSI value based on a maximum function of [log(Mod(I)), log(Mod(Q)), where I is an in-phase component of the first signal and Q is a quadrature component of the first signal.

11. The method of claim 9, wherein the obtaining the second RSSI value comprises:
calculating the second RSSI value based on a maximum function of [log(Mod(I)), log(Mod(Q)), where I is an in-phase component of the second signal and Q is a quadrature component of the second signal.

12. The method of claim 9 comprises:
the known first power level corresponds to a maximum input power level; and
the known second power level corresponds to a minimum input power level.

13. The method of claim 9, wherein the adjusting the RSSI intercept value of the RSSI curve comprises:
adjusting an offset of an RSSI module that produces the first and second RSSI values.

14. The method of claim 9, wherein the adjusting the slope of the RSSI curve comprises:
adjusting gain of an RSSI module that produces the first and second RSSI values.

15. A radio frequency (RF) receiver comprises:
a low noise amplifier (LNA) operably coupled to amplify, based on an LNA gain setting, inbound RF signals to produce amplified inbound RF signals;
down conversion module operably coupled to convert the amplified inbound RF signals into inbound baseband signals;
analog to digital conversion module operably coupled to convert the inbound baseband signals into digital baseband signals;
baseband processing module operably coupled to convert the digital baseband signals into inbound data and operably coupled to produce the LNA gain setting based on receives signal strength indication (RSSI) of the inbound RF signals; and
an adjustable RSSI module operably coupled to produce the RSSI of the inbound RF signals, wherein the adjustable RSSI module is adjusted by:
measuring power of a first signal to produce a first measured power level, wherein the first signal has a first known power level;
comparing the first known power level with the first measured power level;
when the first known power level compares unfavorably with the first measured power level, adjusting offset of the RSSI module until the first known power level compares favorably with the first measured power level;
measuring power of a second signal to produce a second measured power level, wherein the second signal has a second known power level and the second known power level is less than the first known power level;
comparing the second known power level with the second measured power level; and
when the second known power level compares unfavorably with the second measured power level, adjusting gain of the RSSI module until the second known power level compares favorably with the second measured power level.

16. The RF receiver of claim 15, wherein the adjusting offset of the RSSI module until the first known power level compares favorably with the first measured power level comprises at least one of:
iteratively adjusting the offset of the RSSI module; and
calculating the offset based on the first known power level and the first measured power level.

17. The RF receiver of claim 16, wherein the iteratively adjusting the offset comprises:
adjusting the offset of the RSSI module by a step offset value to produce an iterative adjustment of the offset;
receiving the first signal subsequent to the iterative adjustment of the offset;

measuring the power of the first signal to produce an offset measured power level;

comparing the first known power level with the offset measured power level;

when the comparison is unfavorable, repeating the adjusting, the receiving, the measuring, and the comparing.

18. The RF receiver of claim 15, wherein the adjusting the offset comprises:

adjusting an injected current level of at least one rectifier of the RSSI module.

19. The RF receiver of claim 15, wherein the adjusting gain of the RSSI module until the second known power level compares favorably with the second measured power level comprises at least one of:

iteratively adjusting the gain of the RSSI module; and calculating the gain based on the second known power level and the second measured power level.

20. The RF receiver of claim 19, wherein the iteratively adjusting the gain comprises:

adjusting the gain of the RSSI module by a step offset value to produce an iterative adjustment of the gain;

receiving the second signal subsequent to the iterative adjustment of the gain;

measuring the power of the second signal to produce an gain measured power level;

comparing the second known power level with the gain measured power level;

when the comparison is unfavorable, repeating the adjusting, the receiving, the measuring, and the comparing.

21. The RF receiver of claim 15, wherein the adjusting the gain of the RSSI module comprises:

adjusting a bias level of at least one rectifier of the RSSI module.

22. The RF receiver of claim 15, wherein each of the adjusting offset of the RSSI module until the first known power level compares favorably with the first measured power level and the adjusting gain of the RSSI module until the second known power level compares favorably with the second measured power level comprises:

achieving maximum dynamic range of an analog to digital converter of a radio frequency receiver.

23. A radio frequency (RF) receiver comprises:

a low noise amplifier (LNA) operably coupled to amplify, based on an LNA gain setting, inbound RF signals to produce amplified inbound RF signals;

down conversion module operably coupled to convert the amplified inbound RF signals into inbound baseband signals;

analog to digital conversion module operably coupled to convert the inbound baseband signals into digital baseband signals;

baseband processing module operably coupled to convert the digital baseband signals into inbound data and operably coupled to produce the LNA gain setting based on receives signal strength indication (RSSI) of the inbound RF signals; and an adjustable RSSI module operably coupled to produce the RSSI of the inbound RF signals, wherein the adjustable RSSI module is adjusted by:

obtaining a first RSSI value of a first signal, wherein the first signal has a known first power level;

when the first RSSI value does not substantially correspond to the known first power level, adjusting an RSSI intercept value of an RSSI curve of the RSSI module until the first RSSI value substantially corresponds to the known first power level;

obtaining a second RSSI value of a second signal, wherein the second signal has a known second power level; and when second RSSI value does not substantially correspond to the known second power level, adjusting slope of the RSSI curve until the second RSSI value substantially corresponds to the known second power level.

24. The RF receiver of claim 23, wherein the obtaining the first RSSI value comprises:

calculating the first RSSI value based on a maximum function of [log(Mod(I)), log(Mod(Q)), where I is an in-phase component of the first signal and Q is a quadrature component of the first signal.

25. The RF receiver of claim 23, wherein the obtaining the second RSSI value comprises:

calculating the second RSSI value based on a maximum function of [log(Mod(I)), log(Mod(Q)), where I is an in-phase component of the second signal and Q is a quadrature component of the second signal.

26. The RF receiver of claim 23 comprises:

the known first power level corresponds to a maximum input power level; and the known second power level corresponds to a minimum input power level.

27. The RF receiver of claim 23, wherein the adjusting the RSSI intercept value of the RSSI curve comprises:

adjusting an offset of the RSSI module.

28. The RF receiver of claim 23, wherein the adjusting the slope of the RSSI curve comprises:

adjusting gain of the RSSI module.

* * * * *